SHORT FORWARD CONDITIONAL SKIP HARDWARE

Filed March 28, 1969 3 Sheets-Sheet 1

| PRIOR ART TAG | INVENTION TAG | PROGRAM |
|---|---|---|
| | | (1) X X X |
| | | (2) BRANCH |
| C | C | (3) X X X |
| C | C | (4) X X X |
| C | $\overline{C}$ | (5) TARGET |
| C | $\overline{C}$ | (6) X X X |

INVENTORS
DAVID W. ANDERSON
FRANCIS J. SPARACIO
BY Douglas R. McKechnie
ATTORNEY

United States Patent Office 3,553,655
Patented Jan. 5, 1971

3,553,655

SHORT FORWARD CONDITIONAL SKIP HARDWARE

David W. Anderson and Francis J. Sparacio, Poughkeepsie, N.Y., assignors to International Business Machines Corporation, Armonk, N.Y., a corporation of New York Filed Mar. 28, 1969, Ser. No. 811,467
Int. Cl. G06f 9/00
U.S. Cl. 340—172.5 4 Claims

ABSTRACT OF THE DISCLOSURE

A data processing system has an instruction unit and an execution unit. In processing a program, when a conditional branch instruction is encountered and the status of the condition is not yet resolved, the system operates in a conditional mode. In such mode, a limited number of instructions are issued by the instruction unit to the execution unit. Should the target instruction be within the limited number, and thus be considered to involve a short forward jump or skip, it is issued on a noncancellable basis while instructions between the branch instruction and the target instruction are issued subject to cancellation or execution in the event the branch is taken or is not taken, respectively.

BACKGROUND OF THE INVENTION

Field of the invention

This invention relates to automatic stored program digital data processing systems of the type that conditionally issue instructions, following a conditional branch instruction, when the branch condition is not known at the time the branch instruction is decoded. More particularly, it relates to means for improving system performance where a program involves short forward skip or branch instructions.

Prior art

As is well-known, the operations of a stored program data processing system are of two general types: those dealing with moving data and information in and out of the system and those involving the planned processing within the system. The former operations are known as input/output or I/O operations and are generally performed in channels and I/O devices. The latter operations are performed in a central processing unit that comprises a main storage, a control section and an execution section. The operations are carried out under the control of the program stored in the main storage.

As is also well-known, a program is a series of instructions designed to perform a desired task or procedure. The instructions direct the individual operations to be performed. The instructions are usually stored in adjacent or sequential locations in the main storage and they are sequentially processed by the control and execution sections. To shorten programs and to provide a system with decision making capabilities, programs customarily include a type of instruction known as a conditional branch instruction. This type of instruction directs the next instruction to be processed to be taken from one of two different locations dependent upon the status of some condition within the system. If the condition is not present, then no branch is taken and the next instruction to be processed is usually the next sequentially located instruction. If the condition is present, then the branch is taken and the next instruction to be processed is taken from some other point in the program. This next instruction is known as the target instruction and it is located at the target address. The target instruction may be backward in the sequence of instructions to some instruction that has already been performed, or it may be forward in the stream of instructions so that one or more instructions might be skipped.

In order to increase the rate at which instructions can be processed, high speed systems have been devised in which there is a high degree of concurrency or overlap in executing the instructions. That is, more than one instruction may be in the process of being executed at a given time whereby individual instructions are in different stages of execution. Such systems pose problems as to how conditional branch instructions are to be handled because the status of the condition governing the branch may be dependent upon the final result of some instruction that is not fully executed at the time a conditional branch instruction is encountered.

Quite obviously, a system could be designed so that when this event happens, the system instruction processing could cease until such time as the status of the condition becomes known. However, such a system would be inefficient in that several machine cycles might be wasted waiting for the results. In order to overcome this difficulty then, systems have been devised in which an assumption is made as to which path, i.e., the branch or no-branch path, is likely to be taken and additional instructions are conditionally fetched and issued along such path. These conditionally issued instructions are decoded by the control unit and are sent to and buffered in the execution units along with a conditional tag. Thus, when the condition becomes known, if the assumed path is correct, the tag is removed allowing the instructions to be executed. However, if the assumption is wrong, then the system has to backtrack to the branch point and fetch and issue instructions along the other path. While such backtracking does involve wasted time, it has been found that the concept of using conditionally issued instructions with the possibility of having to backtrack, provides improved performance. An example of a data processing system which acts in this manner is disclosed in U.S. Pat. 3,418,638, issued Dec. 24, 1968 for "Instruction Processing Unit for Program Branches."

The system disclosed in said patent includes an instruction unit provided with a buffer register array for holding a series of instructions. The buffer register array normally holds the current instruction being decoded, a limited number of instructions that have already been decoded and issued, and a limited number of instructions that have been prefetched and are about to be decoded. The instructions are fed from the array to a decoding register which issues control signals to the execution units and fetches the necessary operands. Upon encountering a conditional branch instruction, if the condition is not known at the time of decoding such instruction, then the additional instructions in the buffer, which have not yet been decoded, are passed through the decoding register and issued to the execution units along with tags indicating that the machine is in a conditional mode. Such instructions are issued along the no-branch path. When the condition becomes known, the tag is either removed, when a condition is not met, allowing the instruction to be executed or the instructions are cancelled when the condition is met and a branch is to be taken. When a branch is taken, the instruction unit is backed up or, as stated in said patent, "initialized" by fetching the target instruction and additional instructions along the target path.

Summary of the invention

In connection with the operation of the system described above, we have noted that certain types of programs involve a relatively large percentage of conditional branch instructions whose target instructions are located forward in the series of instructions in the program whereby there are only a limited number of instructions located between the branch instruction and the target instruction. This type of a conditional branch instruction provides a short forward jump or skip when conditions are met. For example, there might be only two or three intervening instructions. It thus happens when a conditional branch instruction is encountered and the condition is not yet resolved, that the instructions issued along the no-branch path also include the target instruction. But, with a system designed as described in the copending application, while these instructions are all conditionally issued, if the condition exists by which the branch path is taken, then the unit is initialized regardless of the fact that the target instruction has already been issued and is ready to be executed.

Our invention resides in improving such a system by eliminating the need for such initialization when the target instruction is only a short forward distance from the branch instruction.

Thus, one of the objects of the invention is to provide a system operable in a conditional mode in such a manner that a target instruction conditionally issued is not subject to cancellation regardless of the status of the condition causing the conditional mode operation.

Another object of the invention is to provide a system operable in a conditional mode which obviates the need for any initialization when the target instruction is one of the conditionally issued instructions.

Another object of the invention is to provide a system having improved performance for programs of the type involving a large number of conditional branch instructions where each target instruction is a short forward distance from a branch instruction.

In accordance with an advantageous embodiment of the invention, an instruction unit sequentially processes instructions one at a time. Upon encountering a conditional branch instruction, for which the status of the condition is not known at the time, the system initiates operation in a conditional mode. When the system enters the conditional mode of operation, a comparison circuit is activated which compares the address of each instruction issued after the branch instruction with the target address. When there is no comparison, indicating that the particular instruction is not the target instruction, it is issued to execution units along with a tag indicating that the instruction is conditional and may be subject to cancellation in the event a branch is to be taken. Should a comparison exist, indicating that the current instruction being issued is the target instruction, then that instruction and any subsequent instructions are issued to the execution units but without a tag so that such instructions are noncancellable. Thereafter, when the condition becomes known, if the no-branch path is to be taken, the conditionally issued instructions are executed. But, if the branch is to be taken, the conditionally issued instructions are cancelled and the target instruction and subseqeunt instructions are immediately executed. The advantage of this feature then stems from the fact that when a branch is taken and the target instruction has already been forwarded to the execution units, that no initialization or recovery need be made. Consequently, improved performance results especially where a program contains a relatively large number of branch instructions and short forward skips.

The foregoing and other objects, features and advantages of the invention will be apparent from the following more particular description of the preferred embodiment of the invention, as illustrated in the accompanying drawings, wherein.

Figures 1, 2:
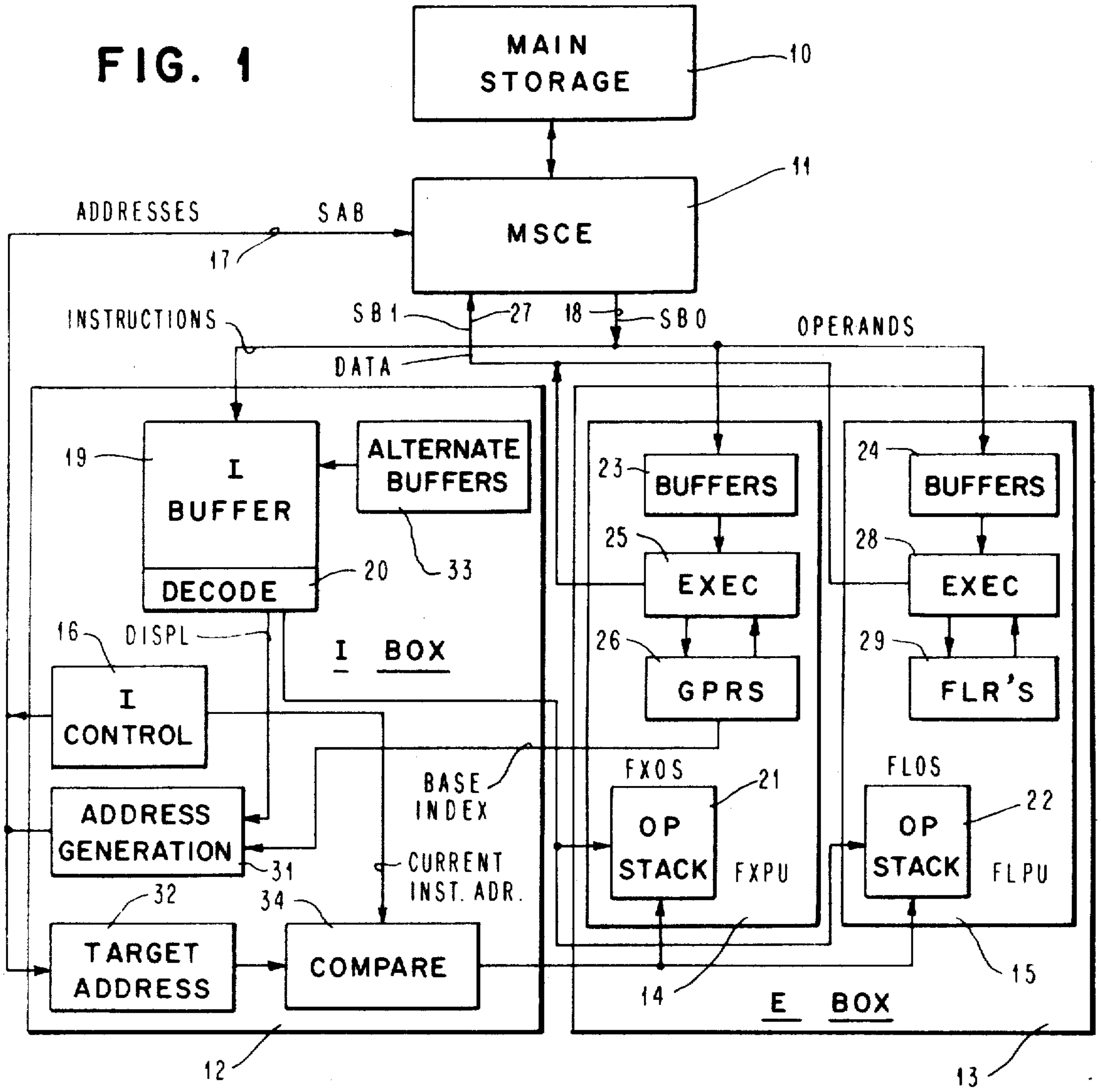
FIG. 1 is a schematic block diagram of a data processing system embodying the invention.
FIG. 2 is a table useful in understanding the relationship of the invention to the prior art structure being improved upon.

Referring now to the drawings, it will be seen that the invention is described herein as embodied in a system of the type described in the aforementioned patent to which reference may be had for details not disclosed herein, the description within said patent being incorporated herein by reference. Only so much of the structure of said system as is necessary to an understanding of the present invention is included herein and the improved portion is shown only in connection with as much of the old system as suffices to show the connection of the invention therewith.

GENERAL DESCRIPTION

The illustrative system includes a main storage 10 connected to a main storage control element (MSCE) 11 that controls the accessing of main storage 10 by an instruction unit or I Box 12 and an execution unit of E Box 13. This latter unit includes two specialized processing units, a fixed point unit (FXPU) 14 and a floating point unit (FLPU) 15.

I Box 12 controls the fetching of instructions and operands from main storage 10, and it includes an instruction control section 16 that issues instruction storage addresses to a storage address bus (SAB) 17. The instructions appear on the storage bus out (SBO) 18 and are placed in an instruction buffer array 19. The instruction control section 16 is used to issue instructions, one at a time, from buffer array 19 to a decoder 20 which, in turn, issues OP codes to the fixed point OP stack (FXOS) 21 and the floating point OP stack (FLOS) 22.

FXPU 14 includes buffers 23 that receive the operands from storage for execution in an execution section 25. A series of general purpose registers (GPR's) 26 communicate with section 25 and are also connected to provide base and index values to I Box 12. Similarly, FLPU 15 includes buffers 24 that receive operands from main storage 10, an execution section 28 for operating on the operands and a series of floating point registers (FLR's) 29. The execution sections 25 and 28 might temporarily store the results in either the GPR's 26 or FLR's 29 or they might provide the results in the form of data which are sent over a storage bus in (SBI) 27 to main storage.

Where an instruction calls for the use of main storage 10, signals are sent from the decode section 20 to an address generation section 31 which places the appropriate address on SAB 17. Dependent upon the type of instruction, the full address could be taken from the contents of one of the GPR's 26, or it can be formed by adding a displacement value obtained from the instruction to a base or index values obtained from GPR's 26.

When a conditional branch instruction is decoded by section 20 and the status of the condition is not resolved, I Box 12 switches into a conditional mode operation. As described in said patent, array 19 includes eight double word buffer registers and the instruction control section 16 attempts to stay ahead of the execution unit by fetching three double words of instructions ahead of the current instruction. As instructions are half-word, word, and three half-words long, these three prefetched doublewords can contain from four to twelve instructions. Thus, when the I Box 12 enters into the conditional mode, it will conditionally issue these instructions one-at-a-time until either all the prefetched instructions are issued, the OP stacks FLOS 22 and FXOS become full, or the status of the condition is resolved.

When the I Box 12 enters the conditional mode, the target address is generated by section 31 and placed in a target address register 32, and a compare circuit 34 is activated. This circuit compares the target address in register 32 with the current instruction address derived from the instruction control section 16. After encountering the initial branch instruction, decode section 16 issues subsequent instructions. So long as compare circuit 34 indicates there is no match between the target instruction and the current instruction, the instructions are issued by section 20 on a conditional basis by providing tag along with each OP code issued to the appropriate OP stack. This tag allows the OP code to be placed within an OP stack and at the same time cause operands to be fetched thereto. But, when the pointer which controls the sequencing of instructions in the OP stack comes upon this particular tag, the tag prevents further execution of instructions within the OP stack until such time as the status of the condition becomes resolved. When the condition becomes resolved, if the no-branch path is to be taken (and this is the path along which the instructions are conditionally issued), then the tag is activated allowing the instructions to be executed. If the branch is to be taken, then those instructions in the OP stack having the tag are cancelled. However, should compare circuit 34 provide an indication that the current instruction being decoded by section 20 is the target instruction, then the target instruction, and any subsequent instruction, is issued to the appropriate OP stack but without the tag indicating that it is cancellable. When the status of the condition becomes resolved the target instruction is executed regardless of whether the branch path or the no-branch path is taken.

FIG. 2 illustrates the relationship of a system operated in accordance with the invention to the prior art system improved upon. In the example, the program has a series of six instructions 1–6, the second instruction being the conditional branch instruction and the fifth instruction being the target instruction. In accordance with the prior art system, where the condition is not known at the time of decoding the branch instruction 2, subsequent instructions 3–6 are each issued with a tag indicating that such instruction is cancellable if the branch is successful. In accordance with the present invention, when the branch instruction 2 is encountered, and the system enters a conditional mode, instructions 3 and 4, which precede target instruction 5, are issued with the tag. But, when the target instruction 5 is issued, it is issued on a noncancellable basis without such tag. Similarly, instruction 6, is issued without the tag. In both systems, when I Box 12 enters the conditional mode, instruction control section 16 fetches the double word containing the target instruction and the double word that follows. Both words are placed in a pair of alternate buffers 33 in order to speed fetching in the event the branch is taken. In the prior art, when the target instruction was conditionally issued, and if the branch was taken, the target instruction was cancelled in the OP stacks and the system was initialized using the target instruction from the alternate buffers 16. Thus, the target instruction was decoded and issued twice to the E Box. In accordance with the present invention, a target instruction conditionally issued to the E Box is not cancelled and so a savings of time and an increase in performance results. When the branch is taken, the instruction words in alternate buffers 33 are simply invalidated, as they are not needed to initialize the system.

DETAILED DESCRIPTION

Figure 3:
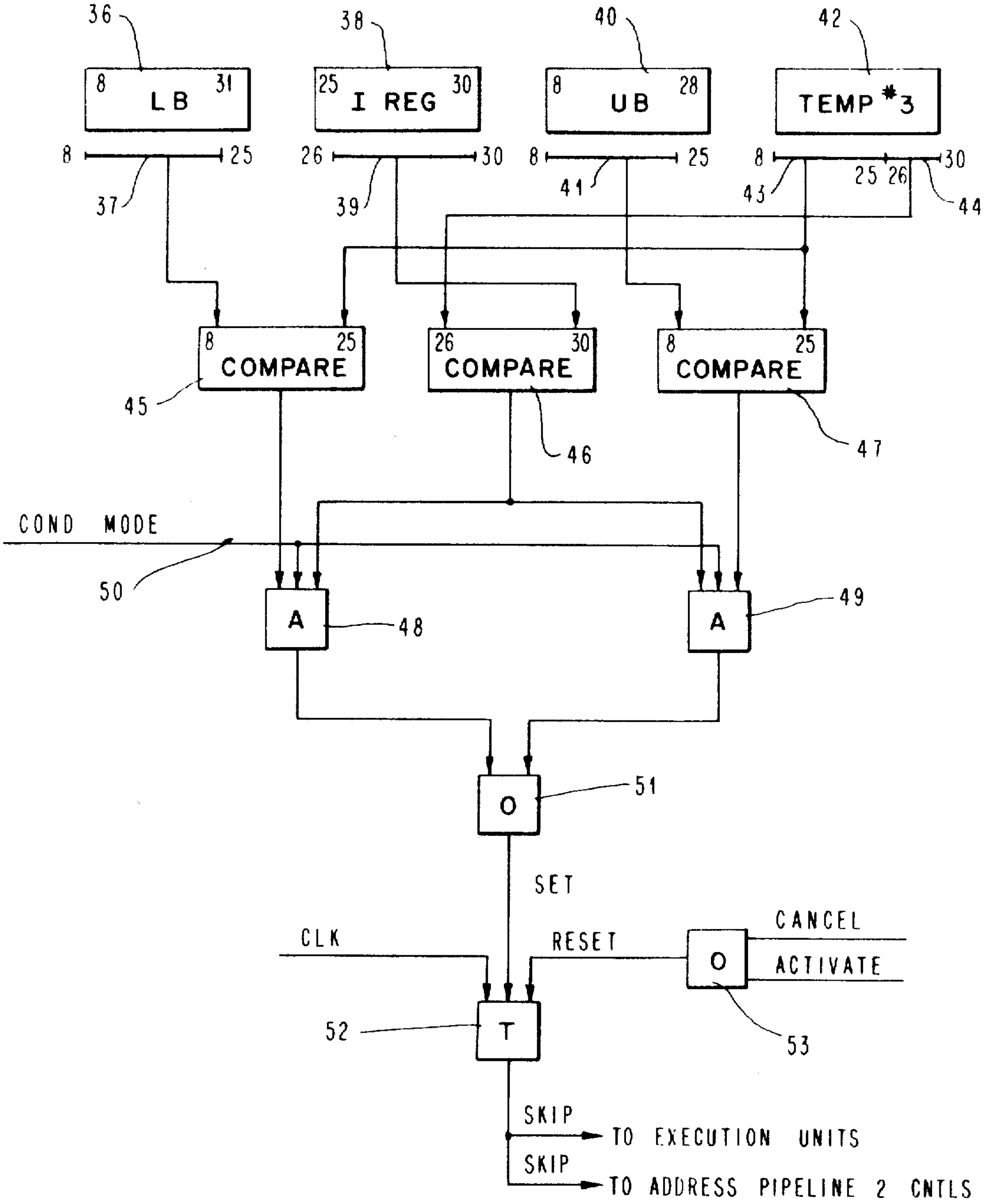
FIG. 3 is a block diagram illustrating how the I Box disclosed in the aforementioned patent can be modified to incorporate the invention.

FIG. 3 shows details of how the I Box disclosed in said patent can be modified to provide means for determining whether an instruction being issued in the conditional mode of operation is a target instruction. The instruction control section of I Box 12 includes three registers, a lower bound (LB) register 36, an I Reg 38 and an upper bound (UB) register 40. LB 36 contains the address of the oldest instruction word in the instruction buffer registers, I Reg 38 contains the address of the instruction being decoded and UB 40 contains the address of the last instruction word which has been called for a fetch. The contents of these registers are loaded and updated as described in said patent so that no detailed description thereof is deemed necessary.

In order to embody the invention, these registers are modified by providing outgates 37, 39 and 41. Gates 37 will outgate bit positions 8–25 of LB 36. Gate 39 outgates bit positions 26–30 of I Reg 38. Gate 41 outgates bits 8–25 of UB 40. The I Box also includes a TEMP #3 Reg 42 connected to the output of the adder that generates the addresses of target instructions. When a conditional branch instruction is encountered, the address of the target instruction is generated and is placed in TEMP #3 Reg 42. This Reg is modified to incorporate the invention by providing gates 43 and 44 for respectively outgating bit positions 8–25 and 26–30. Bit positions 26–30 of I Reg 38 form a concatenation with bit positions 8–25 of both Regs 36 and 40. The bits in positions 8–25 of Regs 36 and 40 may either be the same or different, by one, due to the wrap-around characteristic of instruction buffer array 19. Thus, in order to make the proper comparison for determining whether the instruction being decoded is the target instruction, three compare circuits 45, 46 and 47 are provided. Compare circuit 45 compares the contents of bit positions 8–25 of LB 36 with bit positions 8–25 of TEMP #3 Reg 42. Compare circuit 46 compares the contents of bit positions 26–30 of I Reg 38 with the contents of bit positions 26–30 of TEMP #3 Reg 42. Compare circuit 47 compares the contents of bit positions 8–25 of UB Reg 40 and TEMP #3 Reg 42. If the instruction being decoded is the target instruction whose address has been placed in TEMP #3 Reg 42, then compare circuit 46 will provide an output indicating such comparison and either one or both of compare circuits 45 and 47 will also provide such an output. The outputs of the compare circuits are fed as inputs to AND circuits 48 and 49 that are enabled by a signal on line 50, when the I Box is in a conditional mode. The outputs of AND circuits 48 and 49 are fed as inputs to an OR circuit 51 connected to the set input of a skip trigger 52. The reset line of trigger 52 is connected to an OR circuit 53 so that the skip trigger 52 will be reset when any conditionally issued instructions are either cancelled or activated. Trigger 52 is clocked once each machine cycle to provide a skip signal which is sent to the execution units for issuing the target instruction and any subsequent instructions on a noncancellable basis. The skip signal is also fed to the address pipeline 2 controls to inhibit the issuance of any conditional tag to any CPU request sent to the MSCE. It is to be understood that this latter signal is only a function of the particular system selected for illustrating the invention, and that the details of how other instructions or requests might be handled are not critical but may vary from system to system dependent upon their configurations.

Figure 4:
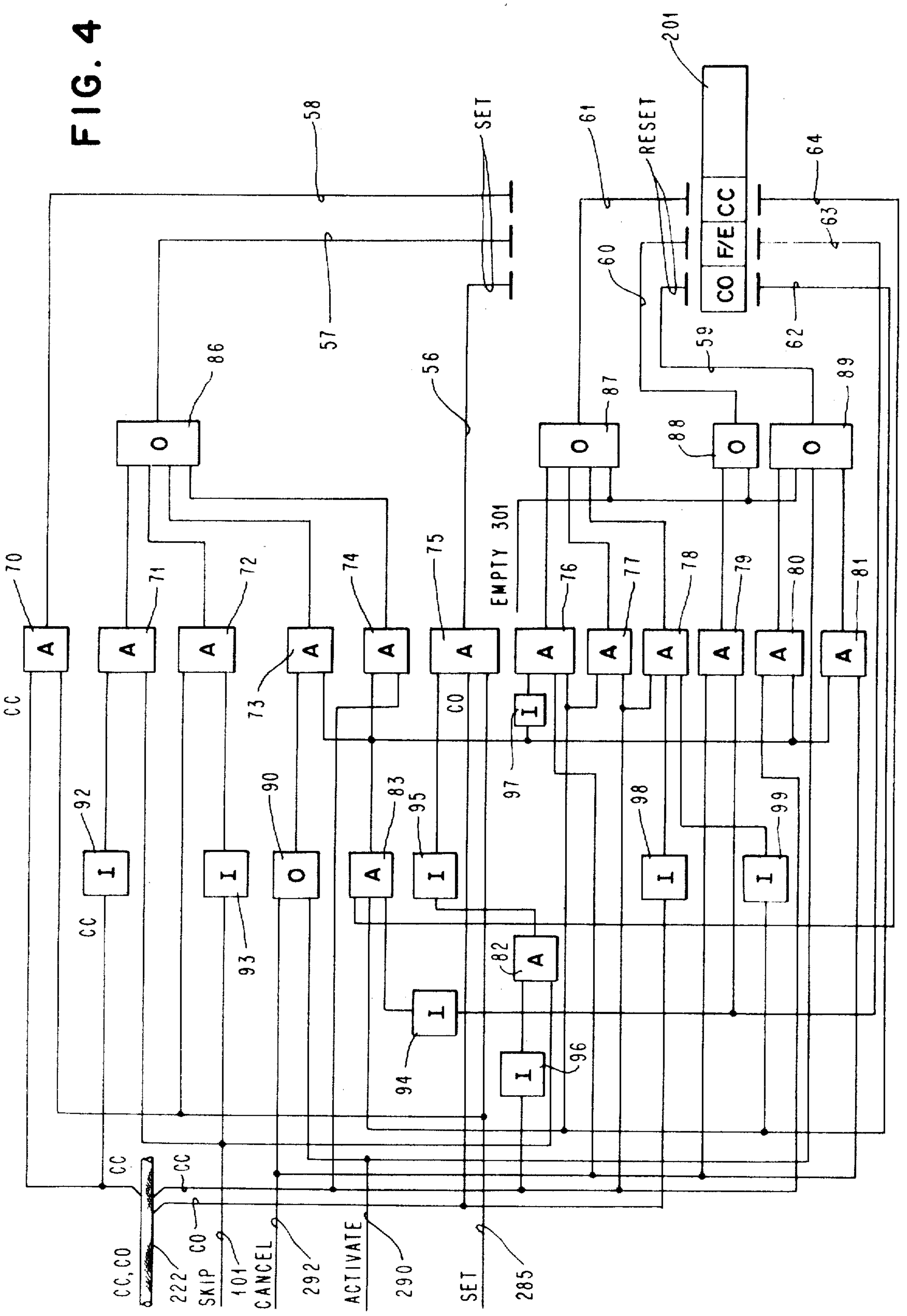
FIG. 4 is a logic diagram illustrating how the execution units may be modified to incorporate the invention.

FIG. 4 illustrates how the logic illustrated in FIG. 10 of said patent is modified to properly control the setting of tags in each of the OP stack positions. In general, this modification involves eliminating the reset CC block and all inputs to the tag positions CO, F/E and CC and replacing them with the connections shown in FIG. 4. The connections to the OP code and control fields of the OP stack position are the same. The three tags provide the control through which the execution units cope with the skip, conditional mode and normal processing. These tags are the CO (Conditional Operations), F/E (Full/Empty) and CC (Set Condition Code) tags. When the CO tag is on, it indicates that the operation in this stack position was issued with the I Box in conditional mode and this includes the time when the skip trigger is on. When the F/E tag is on, it indicates that the particular position of the OP stack in full. When the CC tag is on, it indicates that the particular operation of the associated OP code will set the conditional code in the I Box upon being executed. The various states or combinations which these tags represent is illustrated in Table 1.

TABLE 1

| State | CO | F/E | CC |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

State 0 indicates the stack position is empty. State 1 indicates the stack position is full but the instruction has been cancelled. (The presence of a set CO bit and a reset F/E bit in a stack position will result in a NO-OP operation which will pass over the instruction without execution.) State 2 indicates the stack position is full and to be executed with no setting of the condition code. State 3 indicates the stack position is full and conditional and not to be executed. State 4 is an impossible state and is not used. State 5 indicates the stack position is full, it contains an OP code capable of setting the condition code, the skip flag is on in the I Box, i.e., skip trigger 52 is actuated, and the particular OP code is not to be executed. State 6 indicates that the OP code will set the CC, and the stack position is full and to be executed. State 7 indicates the stack position is full, it contains a conditionally issued instruction, and the instruction is capable of setting the CC.

In connection with FIG. 4, the lines for receiving the empty, set, activate, and cancel signals and the CC and CO bits are identified by the same reference numerals used in FIG. 10 of said patent, to show more clearly how such structure is modified to embody the present invention. Since these signals are the same as in said patent, only a brief description will be given. A set signal on line 285 appears when it is desired to write into a particular OP stack position 201. At the same time, if the OP code being written into the OP stack position is one which will set the condition code, then a CC bit is supplied on bus 222. If the I Box is in a conditional mode of operation, a CO bit also appears on bus 222. When an instruction has been executed from one of the OP stack positions, at the end of the execution cycle the empty signal appears on line 301 allowing the particular OP stack position to be reset. When the condition code becomes set, then either a cancel signal on line 292 or an activate signal on line 290, as appropriate, is supplied.

TABLE 2

| In state | Event | Go-to-state |
|---|---|---|
| 0 | I Box issues unconditional non-CC setter | 2 |
| 0 | I Box issues skip, non-CC setter | 2 |
| 0 | I Box issues conditional Non-CC setter | 3 |
| 0 | I Box issues skip, CC setter | 5 |
| 0 | I Box issues unconditional, CC setter | 6 |
| 0 | I Box issues conditional, CC setter | 7 |
| 5, 6 | I Box issues CC setter | 2 |
| 7 | I Box issues CC setter | 3 |
| 3 | Activate | 2 |
| 3, 7 | Cancel | 1 |
| 5 | Activate or cancel | 6 |
| 7 | Activate | 6 |
| 1, 2, 6 | Empty | 0 |

Table 2 summarizes the events causing a transition of the OP stack tags between the different states of Table 1. As most of the operation is the same as that described in said patent, only those operations necessary to understand the operation in connection with the skip signal will be described in detail below.

Three set inputs 56–58 and three reset inputs 59–61 feed into the tag locations CO, F/E and CC, respectively, of each OP stack position. Each OP stack position 201 is constructed so that a signal appearing on a set input will override any signal appearing on the corresponding reset input. Three output lines 62–64 provide feedback signals for use by the logic circuitry. The logic circuitry includes AND circuits 70–83, OR circuits 86–90 and Invert circuits 92–99 connected as shown in FIG. 4. As the operation of such circuitry is straightforward, detailed description thereof is felt unnecessary except for explaining the opeation of the invention.

As explained previously, when skip trigger 52 is set, a skip signal is sent to the execution unit and this skip signal appears on line 101 at each OP stack position. The operation will be explained by contrasting what happens at an OP stack position when a conditional instruction is issued and to what happens when the target instruction, and any subsequent instruction, is issued. In this example, it is assumed that the intructions are non-CC setters, that is, they involve instructions that will not set the condition code. Initially, the OP stack is in state 0. When the I Box issues the conditional non-CC setting instruction, the logic circuitry of FIG. 4 is operative to change the OP stack setting from state 0 to state 3. In other words, while the tags are each initially set to 0, the result of the setting of the tags to state 3 is that the CO and F/E tags are turned on while the CC tag is unchanged. To accomplish this, when the instruction is issued in the conditional mode, the CO bit appears on bus 222. The F/E tag is set by an active signal appearing on input 57 from OR 86 that receives an active signal from AND 72. This AND circuit receives the active set signal as one of its inputs. The other input is connected to the output of inverter 93 connected to line 101. Thus in the absence of the skip signal, the output of inverter 93 is active. The two active inputs to AND 72 provide the active output. The CO tag is set by an input on line 56 coming from AND 75. This AND circuit has three inputs, one comes from line 285 and is active when the set signal appears thereon. The second input is connected to bus 222 and receives the CO bit signal. The third input is connected to the output of inverter 85. This inverter in turn is connected to the output of AND 82 having two inputs, one connected to the output of inverter 96 whose input is connected to receive the CC bit from bus 222 and the other input is connected to line 101 so as to be activated by the skip signal. Thus, under the conditions of the example, when the conditional instruction is issued, the set signal activates one input to AND 75 and the CO signal activates the second input. The lack of a skip signal on line 101 disables AND circuit 82 so that input to inverter 95 is inactive whereby the output is active so as to complete the third active input to AND 75. Under these conditions, OP stack position 201 is set to state 3.

When in state 3, the OP stack will go to state 2 upon receiving an activate signal or to state 1 upon receiving the cancel signal. When the activate signal is received and the OP stack goes to state 2, and when the particular instruction has been executed so that the empty signal is provided, then the position 201 is set to state 0. However, should the cancel signal be received, then position 201 is set first to state 1 and subsequently, upon receipt of the empty signal, to state 0.

As the I Box issues instructions, should the target instruction be reached, in which case the skip trigger is activated, the following events occur. Assuming the OP stack is in state 0, the skip signal appears on line 101, set signals on line 285 and the CO signal on bus 222. The F/E tag is set by an active signal coming from AND 71. This circuit has two inputs. One is connected to line 101 and is activated by the skip signal. The other is connected to the output of Inverter 92 whose input is connected to the CC bit line of bus 222. In the absence of the CC bit, that is when a nonsetter is issued, the output of inverter 92 will be active so that in conjunction with the active skip signal, the F/E tag will be set. Since both the set and CO signals are present, and since such signals were effective, in the last example, to set the CO tag, it should be noted here why the CO tag is not set. As explained above, the CO tag is set by AND 75, one of whose inputs is connected to the output of Inverter 95 that, in turn, is connected to the output of AND 82. In the absence of the CC bit on bus 222, the output of Inverter 96 will be active so as to activate one of the inputs to AND 82. The other input of AND 82 is activated by the skip signal so as to provide an active signal to Inverter 95. his causes the third input (from Inverter 95) to AND 75 to be inactive so that the conditions for setting the CO tag are not present. In other words, the presence of the skip signal disables the circuitry for setting the CO tag.

Again with reference to Table 2, the only two states from which an instruction may be cancelled are those of states 3 and 7, neither of which can be reached when a skip signal is present. When the OP stack is in state 5, as a result of issuing a signal in conjunction with the skip instruction, which occurs when the target instruction and any subsequent instructions are issued, both activate and cancel signals are effective to switch the OP stack over to state 6 which is a state from which the instruction is executed.

While the invention has been described in connection with how a specific system may be modified to incorporate it, it is understood that the invention is capable of application to other systems in which the specific connections may differ. In any system, the essential elements of the invention would be some means for first detecting when a target instruction may be conditionaly issued and to issue that instruction so as to not be subject to cancellation in the same manner as any preceding conditionally issued instruction.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system operable in a conditional mode, the combination of:

means responsive to a conditional branch instruction for comparing the address of subsequent instructions with the address of the target instruction as such subsequent instructions are issued:

means for issuing instructions as cancellable so long as there is no comparison;

and means responsive to a comparison for issuing instructions on a noncancellable basis.

2. In a data processing system having an instruction unit provided with means for conditionally issuing instructions to an execution unit after a conditional branch instruction until such time as the branch condition is resolved, the combination therewith comprising:

first means responsive to said branch instruction for storing the address of the target instruction;

second means for providing the address of each instruction issued after the branch instruction;

third means for comparing the addresses in said first and second means and providing a match signal when a comparison exists;

and fourth means responsive to said match signal to control said issuing means to issue said target instruction and any succeeding instruction on a noncancellable, executable basis.

3. In a data processing system of the type having one or more execution units provided with buffers for holding OP codes and operands prior to execution, and tags for controlling execution, and a control section which fetches instructions from storage and issues such instructions by decoding them one-at-a-time, by initiating the fetching from storage of any needed operands, and by forwarding OP codes to said execution unit buffers, said control section being operable in a conditional mode, upon issuing a conditional branch instruction when the status of the associated condition is not resolved, to conditionally issue instructions sequential to said branch instruction to said execution unit whereby such instructions are prevented from being executed until said status is resolved, the combination therewith comprising:

first means for detecting whether the target instruction, associated with said branch instruction, is conditionally issued; and second means for tagging OP codes sent to said execution unit buffers, said second means including:

third means for tagging an OP code as issued on a conditional basis subject to cancellation if the branch is to be taken, and fourth means for inhibiting said third means in response to said first means detecting the issuance of said target instruction, whereby a target instruction is issued to said execution unit on a noncancellable basis regardless of whether the branch is taken.

4. The combination of claim 3 wherein:

said first means comprises:

a register for holding the address of said target instruction, a comparator for comparing the address of the target instruction with the address of each instruction conditionally issued, and a trigger connected to the output of aid comparator, said trigger being set when said addresses compare.

References Cited

UNITED STATES PATENTS

| | | |
|---|---|---|
| 3,156,897 | 11/1964 | Bahnsen et al. |
| 3,234,519 | 2/1966 | Scholten. |
| 3,242,464 | 3/1966 | Rakoczi. |

GARETH D. SHAW, Primary Examiner